(12) United States Patent
Gunreben et al.

(10) Patent No.: US 9,725,942 B2
(45) Date of Patent: *Aug. 8, 2017

(54) METHOD FOR CONTROLLING A CLOSING ELEMENT ARRANGEMENT ON A MOTOR VEHICLE

(71) Applicant: Brose Fahrzeugteile GmbH & Co. KG, Hallstadt, Hallstadt (DE)

(72) Inventors: Andre Gunreben, Hallstadt (DE); Christian Weidenbacher, Donnersdorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,511

(22) PCT Filed: Jul. 2, 2013

(86) PCT No.: PCT/EP2013/063905
§ 371 (c)(1),
(2) Date: Jan. 2, 2015

(87) PCT Pub. No.: WO2014/006028
PCT Pub. Date: Jan. 9, 2014

(65) Prior Publication Data
US 2015/0345205 A1    Dec. 3, 2015

(30) Foreign Application Priority Data

Jul. 2, 2012   (DE) .................. 10 2012 013 065

(51) Int. Cl.
*E05F 15/70*   (2015.01)
*E05F 15/40*   (2015.01)
(Continued)

(52) U.S. Cl.
CPC ............... *E05F 15/70* (2015.01); *B60J 5/10* (2013.01); *E05F 15/40* (2015.01); *E05F 15/73* (2015.01);
(Continued)

(58) Field of Classification Search
CPC . E05F 15/70; E05F 15/40; E05F 15/73; E05F 15/77; E05F 15/611; E05Y 2400/53;
(Continued)

(56) References Cited

U.S. PATENT DOCUMENTS

| 4,595,331 A | 6/1986 | Thompson et al. |
| 5,531,498 A | 7/1996 | Kowall |

(Continued)

FOREIGN PATENT DOCUMENTS

| DE | 10110493 | 9/2002 |
| DE | 10235925 | 2/2004 |

(Continued)

OTHER PUBLICATIONS

"International Search Report and Written Opinion," for PCT/EP2013/063905 related to U.S. Appl. No. 14/412,511, mailed Aug. 1, 2013 (8 pages) [English Translation].

(Continued)

*Primary Examiner* — Russell Frejd
(74) *Attorney, Agent, or Firm* — Pauly, DeVries Smith & Deffner, LLC

(57) ABSTRACT

A method for activating a closure element arrangement of a motor vehicle, wherein the closure element arrangement has a closure element, a drive arrangement assigned to the closure element, and a control arrangement. In the context of operator control event monitoring by the control arrangement, monitoring is carried out to ascertain whether a predetermined operator control event is present. An activation of the drive arrangement is performed depending on the (Continued)

result of the operator control event monitoring. With assumed freedom of collision of the closure element from the motor vehicle surroundings, the occurrence of various special conditions does not permit the operator control event monitoring, or permits it only to a restricted extent. The control arrangement detects the occurrence of predetermined special conditions and the activation of the closure element arrangement is deactivated depending on the respectively detected special condition.

20 Claims, 3 Drawing Sheets

(51) Int. Cl.
E05F 15/73 (2015.01)
E05F 15/77 (2015.01)
B60J 5/10 (2006.01)

(52) U.S. Cl.
CPC ........... *E05F 15/77* (2015.01); *E05Y 2400/53* (2013.01); *E05Y 2400/852* (2013.01); *E05Y 2400/858* (2013.01); *E05Y 2800/40* (2013.01); *E05Y 2900/546* (2013.01)

(58) Field of Classification Search
CPC ........... E05Y 2400/858; E05Y 2800/40; E05Y 2900/546; E05Y 2400/852
See application file for complete search history.

(56) References Cited

U.S. PATENT DOCUMENTS

| | | |
|---|---|---|
| 5,844,486 A | 12/1998 | Barron et al. |
| 6,275,146 B1 | 8/2001 | Kithil et al. |
| 6,478,357 B2 | 11/2002 | Zhou |
| 6,719,356 B2 | 4/2004 | Cleland et al. |
| 7,880,481 B2 | 2/2011 | Zangl et al. |
| 8,027,769 B2 | 9/2011 | Zander et al. |
| 8,225,458 B1 | 7/2012 | Hoffberg et al. |
| 8,284,022 B2 | 10/2012 | Kachouh |
| 8,534,743 B2 | 9/2013 | Scheler |
| 8,606,467 B2 | 12/2013 | Gehin |
| 8,788,152 B2 | 7/2014 | Reimann et al. |
| 9,081,032 B2 | 7/2015 | Lange |
| 9,283,994 B2 | 3/2016 | Holzberg et al. |
| 2002/0030666 A1 | 3/2002 | Philipp et al. |
| 2002/0074959 A1 | 6/2002 | Van Wiemeersch et al. |
| 2002/0084675 A1 | 7/2002 | Buchanan, Jr. et al. |
| 2002/0143452 A1* | 10/2002 | Losey ............... B60J 7/0573 701/49 |
| 2004/0085079 A1 | 5/2004 | Lin et al. |
| 2004/0178924 A1 | 9/2004 | Gifford et al. |
| 2005/0004723 A1 | 1/2005 | Duggan et al. |
| 2005/0114276 A1 | 5/2005 | Hunter et al. |
| 2005/0231194 A1 | 10/2005 | Baldi et al. |
| 2006/0267374 A1* | 11/2006 | Jackson ............... B60J 5/06 296/146.4 |
| 2006/0293800 A1 | 12/2006 | Bauer et al. |
| 2007/0072154 A1 | 3/2007 | Akatsuka et al. |
| 2007/0146120 A1 | 6/2007 | Kachouh et al. |
| 2008/0068145 A1* | 3/2008 | Weghaus ............ B60R 25/2054 340/426.25 |
| 2008/0088188 A1 | 4/2008 | Busch et al. |
| 2008/0195273 A1 | 8/2008 | Matsuura et al. |
| 2008/0303685 A1 | 12/2008 | Nakano et al. |
| 2009/0222174 A1* | 9/2009 | Frommer ............... E05F 15/77 701/49 |
| 2009/0243826 A1 | 10/2009 | Touge et al. |
| 2010/0211283 A1 | 8/2010 | Harrison et al. |
| 2010/0256875 A1 | 10/2010 | Gehin et al. |
| 2011/0118946 A1* | 5/2011 | Reimann ............ B60R 25/2036 701/49 |
| 2011/0234370 A1* | 9/2011 | Briese ................... B60R 25/24 340/5.6 |
| 2011/0276234 A1* | 11/2011 | Van Gastel ............ E05B 81/78 701/49 |
| 2011/0313619 A1 | 12/2011 | Washeleski et al. |
| 2012/0188078 A1 | 7/2012 | Soles et al. |
| 2012/0290177 A1 | 11/2012 | Wagenhuber et al. |
| 2013/0221626 A1 | 8/2013 | Lee et al. |
| 2013/0234733 A1 | 9/2013 | Lange et al. |
| 2013/0234828 A1 | 9/2013 | Holzberg et al. |
| 2013/0311039 A1 | 11/2013 | Washeleski et al. |
| 2014/0032055 A1* | 1/2014 | Holzberg ............... B62D 25/12 701/49 |
| 2014/0195073 A1 | 7/2014 | Herthan |
| 2014/0236446 A1 | 8/2014 | Spence et al. |
| 2014/0277993 A1 | 9/2014 | Hookway et al. |
| 2014/0285217 A1 | 9/2014 | Van Gastel et al. |
| 2014/0324273 A1 | 10/2014 | Russ et al. |
| 2014/0373447 A1* | 12/2014 | Gunreben .......... G07C 9/00309 49/31 |
| 2015/0019085 A1 | 1/2015 | Ma |
| 2015/0128497 A1* | 5/2015 | Schuetz ................. E05F 15/73 49/31 |
| 2015/0134208 A1* | 5/2015 | Gunreben ............ B60R 25/2054 701/49 |
| 2015/0176322 A1 | 6/2015 | Wuerstlein et al. |
| 2015/0176323 A1 | 6/2015 | Ebert |
| 2015/0176324 A1 | 6/2015 | Ebert |
| 2015/0233167 A1 | 8/2015 | Natsui |
| 2015/0258879 A1 | 9/2015 | Mandzak |

FOREIGN PATENT DOCUMENTS

| | | |
|---|---|---|
| DE | 10254708 | 6/2004 |
| DE | 102004055982 | 6/2006 |
| DE | 102004057220 | 6/2006 |
| DE | 102005042402 | 3/2007 |
| DE | 102005055002 | 5/2007 |
| DE | 202005020140 | 6/2007 |
| DE | 10158533 | 2/2009 |
| DE | 102009004384 | 7/2009 |
| DE | 102008041354 | 2/2010 |
| DE | 102009041555 | 6/2010 |
| DE | 102008063366 | 7/2010 |
| DE | 102009047066 | 5/2011 |
| DE | 102009055778 | 7/2011 |
| DE | 102010048144 | 7/2011 |
| DE | 102010006213 | 8/2011 |
| DE | 102010002559 | 9/2011 |
| DE | 102011112274 | 3/2013 |
| DE | 102012013065 | 1/2014 |
| DE | 102013114881 | 6/2015 |
| EP | 0711977 | 5/1996 |
| EP | 1422366 | 5/2004 |
| FR | 2943190 | 9/2010 |
| GB | 2376075 | 12/2002 |
| JP | 02055168 | 2/1990 |
| JP | 6018547 | 1/1994 |
| JP | 2007228640 | 9/2007 |
| JP | 2009079353 | 4/2009 |
| JP | 2010236184 | 10/2010 |
| WO | 2005084979 | 9/2005 |
| WO | 2007/006514 | 1/2007 |
| WO | 2010076322 | 7/2010 |
| WO | 2011092206 | 8/2011 |
| WO | 2012052210 | 4/2012 |
| WO | 2012/084111 | 6/2012 |
| WO | 2013034252 | 3/2013 |
| WO | 2013091839 | 6/2013 |

OTHER PUBLICATIONS

"Search Report," for German Patent Application No. 102012013065.1 related to U.S. Appl. No. 14/412,511, mailed Jun. 28, 2013 (5 pages).

(56) References Cited

OTHER PUBLICATIONS

German Search Report, DE Application No. 1020130185939, priority application of this application, U.S. Appl. No. 14/535,945 dated Oct. 29, 2014, 8 pages.
Non-Final Office Action for U.S. Appl. No. 14/535,495, mailed Jun. 15, 2015 (6 pages).
Brose Fahrzeugteile Gmbh & CO.KG, "Sesam oeffne Dich. In: AutomobilKONSTRUKTION," Feb. 2012 (pp. 50-51), with English translation (4 pages).
European Search Report for EP Application No. 13713812.2 corresponding to U.S. Appl. No. 13/951,163 dated Oct. 31, 2013 (3 pages).
German Search Report for DE Application No. 102011112274.9 corresponding to U.S. Appl. No. 14/343,005, mailed May 9, 2012 (4 pages).
German Search Report for German Patent Application No. 102013114883.2, mailed on Feb. 2, 2014 (5 pages).
International Search Report for application No. PCT/EP2013/066998 corresponding to U.S. Appl. No. 14/343,005, mailed Oct. 26, 2012 (6 pages).
International Search Report for PCT/EP2012/005234 related to U.S. Appl. No. 14/367,786, mailed Jun. 14, 2013 (3 pages).
International Written Opinion for PCT/EP2012/005234 related to U.S. Appl. No. 14/367,786, completed Jun. 7, 2014 (10 pages).
Non Final Office Action Citation for U.S. Appl. No. 14/367,786 mailed Feb. 1, 2016 (15 pages).
Non Final Office Action for U.S. Appl. No. 14/343,005, mailed Feb. 11, 2016 (23 pages).
Non Final Office Action for U.S. Appl. No. 13/951,163, mailed on Dec. 17, 2014 (31 pages).
Non-Final Office Action for U.S. Appl. No. 14/581,441, mailed Jun. 3, 2016 (10 pages).
Notice of Allowance for U.S. Appl. No. 13/951,163, mailed Nov. 6, 2015 (13 pages).
Office Action for KR Patent Application No. 10-2013-0087175 corresponding to U.S. Appl. No. 13/951,163 completed Jan. 21, 2015 (13 pages).
Search Report for German Application No. 102012014676.0 corresponding to U.S. Appl. No. 13/951,163, mailed Jan. 18, 2013 (5 pages).
Office Action for Co-Pending Chinese Patent Application No. 201380035947.X, mailed Jul. 13, 2016 (11 pages), no translation available.
Office Action for Co-Pending Chinese Patent Application No. 201380035947.X, mailed Nov. 4, 2015 (9 pages), no translation available.

\* cited by examiner

METHOD FOR CONTROLLING A CLOSING ELEMENT ARRANGEMENT ON A MOTOR VEHICLE

CROSS-REFERENCE TO RELATED APPLICATIONS

This application is a national stage application under 35 U.S.C. 371 of International Patent Application Serial No. PCT/EP2013/063905, entitled "Verfahren zur Ansteuerung einer Verschlusselementanodnung eines Kraftfahrzeugs," filed Jul. 2, 2013, which claims priority from German Patent Application No. DE 10 2012 013 065.1, filed Jul. 2, 2012.

FIELD OF THE TECHNOLOGY

The invention relates to a method for activating a closure element arrangement of a motor vehicle and to a control arrangement for carrying out such a method.

BACKGROUND

Present-day motor vehicles are increasingly being equipped with motor-actuable closure elements. Such closure elements can be, for example, doors such as side and rear doors, in particular sliding doors, flaps, in particular tailgates, trunk lids, hoods, cargo area floors or the like of a motor vehicle. In this respect, the term "closure element" should be understood broadly in the present case.

A convenience function currently accorded great importance is the automatic actuation of the motorized tailgate of a motor vehicle. The known method (DE 101 58 533 B4), on which the invention is based, provides for a user-side operator control event, namely the actuation of a radio remote control, to bring about the motor-based opening of the tailgate. The rear parking sensors of the motor vehicle are used here for the sensor-based detection of possible collisions with the motor vehicle surroundings, that is to say with components that should not be ascribed to the motor vehicle. The activation of the tailgate is deactivated in the case of the positive detection of such obstacles. Ideally, a smooth motor-based adjustment of the tailgate is thus ensured.

What is disadvantageous about the known method, however, is the fact that a slight change in the operating conditions for the motor vehicle, in particular a change in the mechanical configuration of the motor vehicle, can lead to an impairment of the function of the above sensors. One example of a change in the mechanical configuration which can impair the function of the sensors by virtue of shading effects or the like is the mounting of a bicycle carrier. As a result this impairs the operating safety during the motor-based actuation.

The above situation is further aggravated by the fact that, in particular, the motor-based opening of tailgates is increasingly being triggered by user movements (DE 20 2005 020 140 U1). Here provision can be made, for example, for a user-side foot movement to bring about the motor-based opening of the tailgate. An above configuration change of the motor vehicle can disturb the sensor-based detection of the operator control events by the sensor arrangement.

The invention addresses the problem of embodying and developing the known method in such a way as to ensure a high operating safety in particular in the case of a change in the mechanical configuration of the motor vehicle.

SUMMARY

Embodiments relate to methods and control arrangements for activating a closure element arrangement of a motor vehicle. What can be essential is the insight that a deactivation of the activation of the closure element arrangement is advisable not only in the case of a possible collision with the motor vehicle surroundings, but also in the case of a plurality of particular operating conditions, which are designated hereinafter as "special conditions". These special conditions are distinguished by the fact that when a special condition occurs, the operator control event monitoring is not possible or is possible only to a restricted extent.

It is now proposed that by means of the control arrangement the occurrence of predetermined special conditions is detected and that the activation of the closure element arrangement is deactivated depending on the respectively detected special condition at least for a predetermined operator control event.

As a result, the control arrangement generally ensures that, depending on the detection of a special condition, the operator control event respectively present does not trigger a motor-based adjustment of the closure element. In this respect, the term "deactivation" should be interpreted broadly.

What is of interest is the fact that the proposed solution makes it possible to differentiate between special conditions, such that suitable measures, in particular the deactivation of the activation of the closure element arrangement, are possible only for a selected operator control event. In this case, a multiplicity of predetermined special conditions can be stored in the control arrangement. It is also conceivable, however, for just a single predetermined special condition to be stored in the control arrangement, said special condition leading to a corresponding deactivation.

An embodiment provides for the deactivation of the activation of the closure element arrangement to be performed depending on the detected special condition for individual or for all predetermined operator control events. In this case, an operator control event can be an actuation of a remote control and a further operator control event can be a user movement.

The above differentiated deactivation allows an optimum compromise between high operating safety and high use convenience.

Some embodiments relate to exemplary special conditions which can advantageously be taken into account by the proposed solution.

Some embodiments relate to advantageous variants for the detection of the respective special condition. In this case, it is provided that the sensor measurement values of the existing sensor arrangement, the configuration change—taken as a basis for the special condition—of the motor vehicle itself or the sensor measurement values of an additional sensor are used for detecting the respective special condition. The first two variants mentioned can be realized with particularly low outlay in terms of hardware.

According to a further teaching, a control arrangement for carrying out the proposed method as such is disclosed herein. Reference may be made to all explanations suitable for elucidating the control arrangement.

In an embodiment, a method for activating a closure element arrangement of a motor vehicle, is provided. The closure element arrangement has a closure element, a drive arrangement assigned to the closure element, and a control arrangement, wherein in the context of an operator control event monitoring by means of the control arrangement monitoring is carried out to ascertain whether a predetermined operator control event is present, and an activation of the drive arrangement is performed depending on the result of the operator control event monitoring, wherein with assumed freedom of collision of the closure element from the motor vehicle surroundings the occurrence of various special conditions does not permit the operator control event monitoring or permits it only to a restricted extent, and in that by means of the control arrangement the occurrence of predetermined special conditions is detected and the activation of the closure element arrangement is deactivated depending on the respectively detected special condition at least for a predetermined operator control event.

In an embodiment, the closure element arrangement has a transmitting/receiving unit for a user-side remote control, and in that in the context of the operator control event monitoring by means of the control arrangement the reception signals of the transmitting/receiving unit are monitored in respect of whether a predetermined actuation of the remote control is present, and an activation of the closure element arrangement is performed depending on the result of the operator control event monitoring.

In an embodiment, the closure element arrangement has a sensor arrangement having at least one sensor element embodied as proximity sensor, in particular, wherein in the context of the operator control event monitoring by means of the control arrangement the sensor measurement values of the sensor arrangement are monitored in respect of whether a predetermined operator control event is present, and an activation of the closure element arrangement is performed depending on the result of the operator control event monitoring.

In an embodiment, at least one operator control event is defined as user movement, such as the at least one operator control event is defined as foot movement of the operator, furthermore in various embodiments the sensor arrangement has at least one sensor element which is embodied as proximity sensor and which is arranged in or on a rear paneling part, in particular the rear fender, of a motor vehicle and which can extend over a substantial part of the width of the motor vehicle, such as at least one operator control event is defined as a back and forth movement of the foot of the operator, such as during the operator control event the at least one sensor element generates a pulse-like temporal profile of the sensor measurement values—sensor pulse.

In an embodiment, the deactivation of the activation of the closure element arrangement is performed depending on the detected special condition for individual or all predetermined operator control events.

In an embodiment, a special condition of a first type consists in the fact that the predetermined operator control event is not deemed to be detected in the operator control event monitoring despite the presence of a predetermined user movement, and/or in that a special condition of a second type consists in the fact that the operator control event is deemed to be detected in the operator control event monitoring despite the presence of a user movement that deviates from the predetermined user movement.

In an embodiment, the activation can be triggered both by means of an operator control event of the actuation of the remote control and by means of an operator control event of the user movement, and in that at least one special condition is provided, the detection of which brings about a deactivation of the activation of the closure element arrangement for all predetermined operator control events, and/or in that at least one special condition, in particular the special condition of the first type and/or the special condition of the second type, is provided, the detection of which brings about a deactivation of the activation of the closure element arrangement for the operator control event of the user movement, but not for the operator control event of the actuation of the remote control.

In an embodiment, the mechanical configuration of the motor vehicle in use in accordance with normal operation can be altered by an adjustment process and/or by a mounting process, and in that an altered mechanical configuration of the motor vehicle is detected as predetermined special condition by means of the control arrangement.

In an embodiment, a configuration change, in particular the mounting, of a trailer coupling into an operating position is detected as predetermined special condition by means of the control arrangement.

In an embodiment, the connection of an attachment part of the motor vehicle, in particular of a bicycle carrier, to a trailer coupling of the motor vehicle is detected as predetermined special condition by means of the control arrangement, such as the connection of the attachment part to the trailer coupling comprises an electrical connection and in that the detection of at least one special condition is performed on the basis of the electrical connection.

In an embodiment, the connection of a trailer of the motor vehicle to a trailer coupling of the motor vehicle is detected as predetermined special condition by means of the control arrangement, such as the trailer is a caravan, a horsebox trailer, a tarpaulin trailer, a bicycle trailer or the like.

In an embodiment, an alteration of the measurement conditions for the sensor arrangement is detected as predetermined special condition by means of the control arrangement, such as a rain or car wash situation is detected as predetermined special condition by means of the control arrangement.

In an embodiment, the detection of at least one special condition, in particular of a configuration change of the motor vehicle, is performed on the basis of the sensor measurement values of the sensor arrangement, such as the temporal change of the sensor measurement values influences the detection of the special condition.

In an embodiment, the mechanical configuration change of the motor vehicle is accompanied by an electrical configuration change of the motor vehicle and in that the detection of at least one special condition is performed on the basis of the electrical configuration change.

In an embodiment, the detection of at least one special condition is performed on the basis of the sensor measurement values of an additional sensor, such as a camera arrangement, in particular a rear view camera or an all-round vision camera, is provided and in that the detection of a predetermined special condition, in particular of a rain or car wash situation, is performed on the basis of the senor measurement values of the camera arrangement.

Another embodiment provides a control arrangement for carrying out one or more method described herein.

BRIEF DESCRIPTION OF THE FIGURES

The invention is elucidated in greater detail below with reference to a drawing which only illustrates exemplary embodiments. In the drawing.

DETAILED DESCRIPTION

The proposed method is elucidated below on the basis of a closure element arrangement 1 of a motor vehicle, which closure element arrangement has a closure element 2 embodied as a tailgate. The embodiment of the closure element 2 as a tailgate of a motor vehicle is a focus of the present case. However, reference may be made to the introductory part of the description with regard to the broad understanding of the term "closure element". In this respect, all explanations concerning a tailgate correspondingly apply to all other types of closure element.

Figure 1:
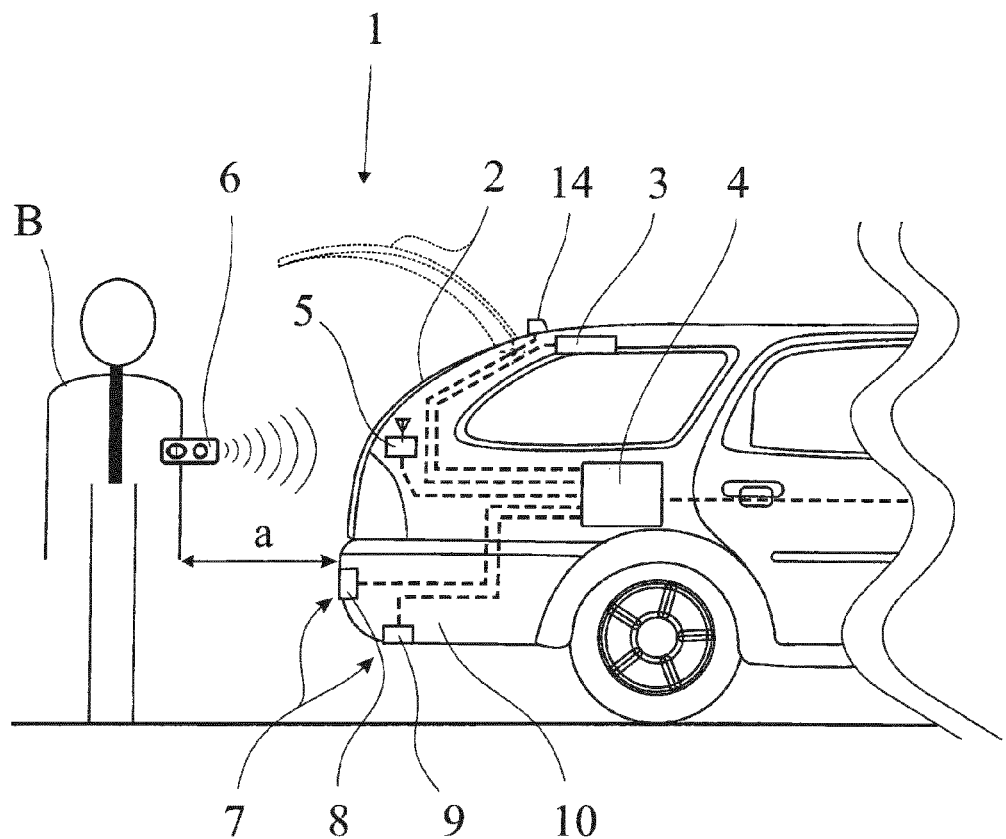
FIG. 1 shows the rear region of a motor vehicle with a proposed closure element arrangement for carrying out the proposed method.

The tailgate 2 is assigned a drive arrangement 3, by means of which an adjustment of the tailgate 2 between the closed position illustrated by a solid line in FIG. 1 and the open position illustrated by a dashed line in FIG. 1 can be brought about.

The drive arrangement 3 can be a motor-based drive arrangement, which furthermore can have an electric drive motor and a feed gear mechanism connected downstream. In an embodiment, the drive arrangement 3 comprises two spindle drives that act on the two lateral regions of the tailgate 2.

In principle, however, it is also conceivable for the drive arrangement 3 to be spring-driven and correspondingly to act in a single direction, such as in the opening direction.

In the illustrated embodiment, the control arrangement 4 has a central hardware structure. It is also conceivable for the control arrangement 4 to have a decentralized hardware structure.

Specific activities of the user B are defined here as operator control event, each of which is intended to trigger a specific reaction of the control arrangement 4. The operator control events can be a predetermined user movement or a predetermined user actuation, as will be explained.

In order to be able to react to the presence of operator control events discussed above, an operator control event monitoring is provided, which is carried out by the control arrangement 4. In the context of the operator control event monitoring, in a manner yet to be explained, by means of the control arrangement 4 monitoring is effected to ascertain whether or not a predetermined operator control event is present. A corresponding activation of the drive arrangement 3, for example the motor-based opening of the tailgate 2, is performed depending on the result of the operator control event monitoring.

The proposed solution assumes the collision freedom of the closure element 2 with the vehicle surroundings. The proposed solution is thus directed to system-local influencing factors. It should be taken into account here that the term "motor vehicle" encompasses everything that moves concomitantly with the motor vehicle during operation when the motor vehicle is being driven. This includes all attachment parts, trailers or the like. The motor vehicle surroundings correspondingly encompass all components which are situated mechanically independently in the surroundings of the motor vehicle.

The proposed solution concerns special conditions which go beyond the collision freedom of the closure element 2 from the motor vehicle surroundings and which do not permit the operator control event monitoring and or permit it only to a restricted extent.

What is essential, then, is that the occurrence of predetermined above special conditions is detected by means of the control arrangement 4 and that the activation of the closure element arrangement 1 is deactivated at least for a predetermined operator control event. A differentiated deactivation of the activation of the closure element arrangement 1 as discussed above is thus possible. As proposed, the deactivation of the activation is effected for the duration of the detection of the respective special condition.

Various variants are known for the operator control events taken as a basis for the operator control event monitoring.

In a first variant, the closure element arrangement 1 has a transmitting/receiving unit 5 for a user-side remote control 6, wherein in the context of the operator control event monitoring by means of the control arrangement 4 the reception signals of the transmitting/receiving unit are monitored in respect of whether a predetermined actuation of the remote control 6 is present. A corresponding activation of the closure element arrangement 1 is then performed depending on the result of the operator control event monitoring. This variant for the operator control events therefore involves customary systematics for a remote control.

The remote control, which can be a radio remote control, is in any case equipped with an open button and a close button. Upon the actuation of one of the two buttons, a radio signal or the like is communicated to the transmitting/receiving unit, the received signal being analyzed in the context of the operator control event monitoring. Depending on whether the open button or the close button was pressed, the corresponding activation of the closure element arrangement 1 in the opening direction or respectively in the closing direction is then effected. In the context of such a signal transmission between the remote control and the transmitting/receiving unit, an authentication code is regularly transmitted.

A second variant for the operator control events goes back to the principle of detecting an operator control event in a sensor-based manner Accordingly, the closure element arrangement 1 has a sensor arrangement 7 having at least one sensor element 8, 9 embodied here as proximity sensor, wherein in the context of the operator control event monitoring by means of the control arrangement 4 the sensor measurement values of the sensor arrangement 7 are monitored in respect of whether a predetermined operator control event is present, and then activation of the closure element arrangement 1 is performed depending on the result of the operator control event monitoring.

The operator control event that can be detected in a sensor-based manner can be defined as user movement. Here it is the case that at least one operator control event is defined as foot movement of the user B. For this purpose, the sensor arrangement 7 has at least one sensor element 8, 9 embodied as proximity sensor, here two of such sensor elements 8, 9. The sensor elements 8, 9 are arranged in or on a rear paneling part 10, here the rear fender 10, of the motor vehicle. The at least one sensor element 8, 9 can extend over a substantial part of the width of the motor vehicle, as can be gathered from the illustration in accordance with FIG. 2a).

Figure 2:
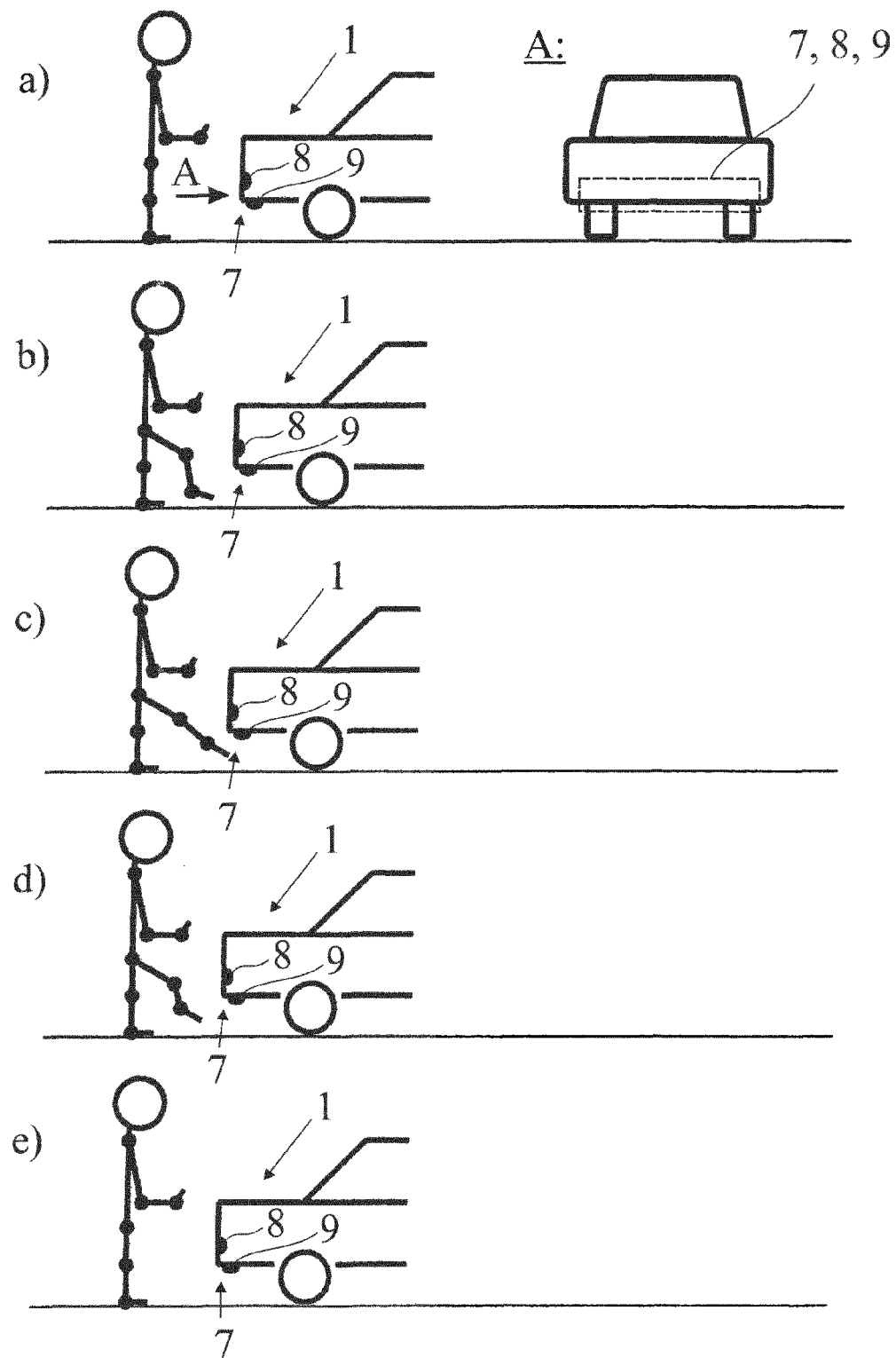
FIG. 2 shows a sequence of a proposed operator control event to be detected in the five stages a) to e)

In various embodiments, at least one operator control event is defined as a back and forth movement of the foot of the operator. FIG. 2 shows in illustrations a) to e) the stages of the sequence of such an operator control event comprising a back and forth movement of the foot of the user B. During the operator control event the at least one sensor element 8, 9 can generate a pulse-like temporal profile of the sensor measurement values, said profile being designated as "sensor pulse" in the present case.

Depending on the detected special condition, it can be provided that the deactivation of the activation of the closure element arrangement 1 is performed either for individual predetermined operator control events or for all predetermined operator control events. For this purpose, it can be advantageous to classify the special conditions, such that a corresponding deactivation can be performed depending on the class of the detected special condition. A possible classification of the special conditions is explained below.

A special condition of a first type can consist in the fact that the predetermined operator control event is not deemed to be detected in the operator control event monitoring despite the presence of a predetermined user movement. This is the case, for example, if the sensor arrangement 7 is shaded by an above mechanical configuration change of the motor vehicle, with the result that, in a faulty fashion, predetermined operator control events actually present cannot be detected by means of the sensor arrangement 7.

A special condition of a second type can consist in the fact that, in a faulty fashion, the predetermined operator control event is nevertheless deemed to be detected in the operator control event monitoring despite the presence of a user movement that deviates from the predetermined user movement.

The selective deactivation depending on the special condition respectively detected is advantageous, in particular, if the activation of the closure element arrangement 1 can be triggered both by means of an operator control event of the actuation of the remote control 6 and by means of an operator control event of the user movement. In this case, in a first alternative it is proposed that at least one special condition is provided, the detection of which brings about a deactivation of the activation of the closure element arrangement 1 for all predetermined operator control events.

It is also conceivable for at least one special condition, here the special conditions of the first type and of the second type, to be provided, the detection of which brings about a deactivation of the activation of the closure element arrangement 1 for the operator control event of the user movement, but not for the operator control event of the actuation of the remote control 6. This, too, is appropriate since a malfunction in the detection of user movements must have the result that no activation of the closure element arrangement 1 goes back to such a detection of the user movement. What is particularly advantageous about this solution is the fact that an activation of the closure element arrangement 1 is possible in an unchanged manner via the remote control 6.

It has already been indicated further above that the mechanical configuration of the motor vehicle in use in accordance with normal operation can be altered by an adjustment process and/or by a mounting process. The mechanical configuration of the motor vehicle in the present sense can comprise a multiplicity of partial configurations. By way of example, the mechanical configuration of the motor vehicle here comprises the mechanical configuration of the closure element of the motor vehicle. Other examples are given further below.

What is of interest, then, is that an altered mechanical configuration of the motor vehicle is detected as predetermined special condition by means of the control arrangement 4 and that a possibly selective deactivation of the closure element arrangement 1 is effected depending on the detected special condition.

Figure 3:
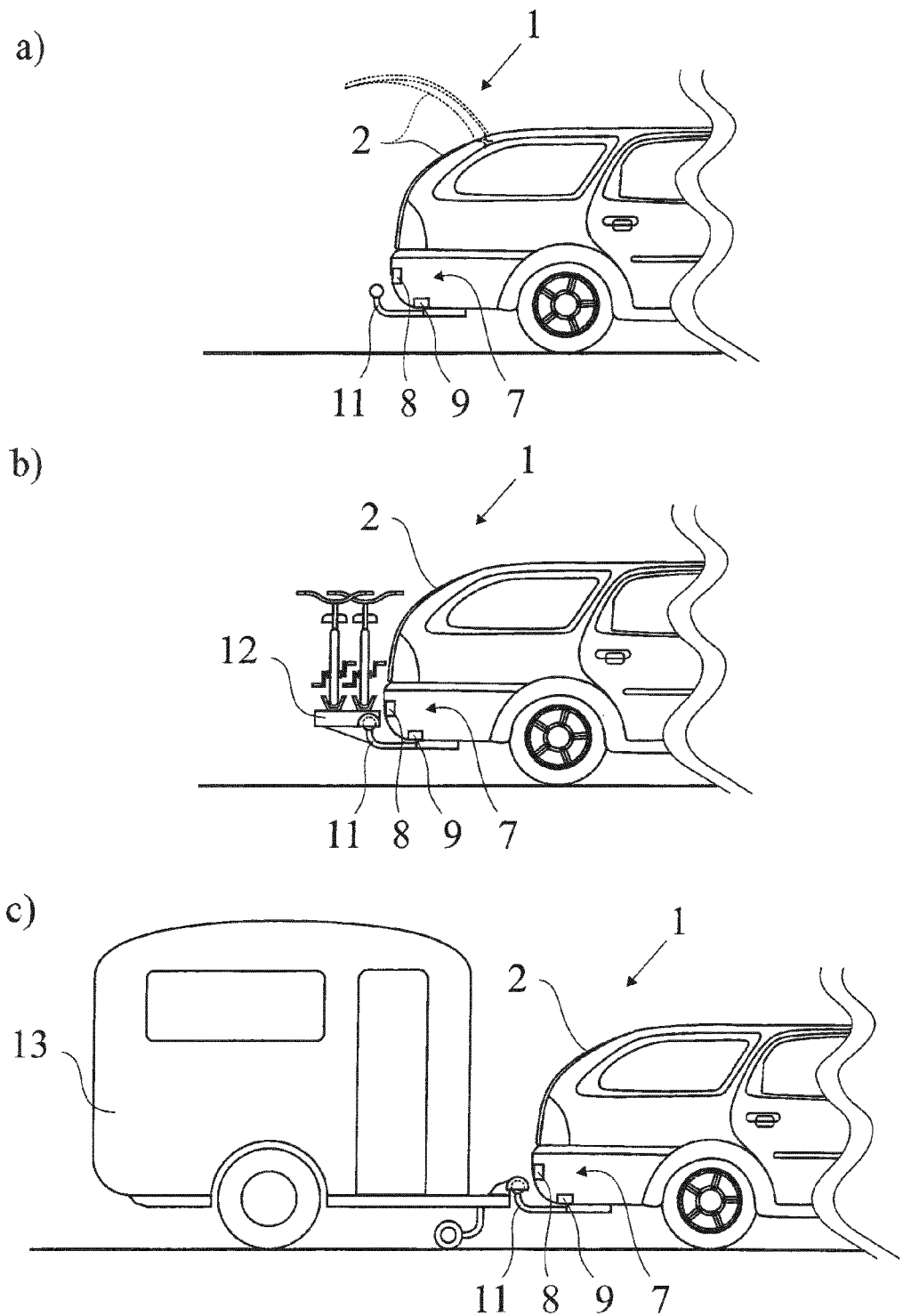
FIG. 3 shows the rear region of the motor vehicle in accordance with FIG. 1 a) with mounted trailer coupling, b) with mounted bicycle carrier and c) with attached caravan.

FIG. 3a) shows a possible change in the configuration of the motor vehicle which corresponds to a predetermined special condition. What is essential in this case is that a configuration change, in particular the adjustment or mounting of a trailer coupling 11 into an operating position, is detected as predetermined special condition by means of the control arrangement 4.

A further, predetermined special condition is shown in FIG. 3b). Here it is the case that the connection of an attachment part 12 of the motor vehicle, here of a bicycle carrier 12, to a trailer coupling 11 of the motor vehicle is detected as predetermined special condition by means of the control arrangement 4. The control-technological detection is particularly simple here since the connection of the attachment part 12 to the trailer coupling 11 comprises an electrical connection, wherein the detection of the respective special condition is correspondingly performed on the basis of the electrical connection.

In principle, the predetermined special condition can also be the connection of a trailer 13 of the motor vehicle to a trailer coupling 11 of the motor vehicle. Numerous possibilities are conceivable here for the embodiment of the trailer 13. By way of example, the trailer 13 can be a caravan, a horsebox trailer, a tarpaulin trailer, a bicycle trailer or the like.

Another variant for a predetermined special condition in the above sense can be the alteration of the measurement conditions for the sensor arrangement 7. Such special conditions can be a rain situation or a car wash situation, for example, which entail a corresponding alteration of the measurement conditions for the sensor arrangement 7.

The hardware construction of the arrangement is fashioned particularly simply if the detection of at least one special condition, such as of a configuration change of the motor vehicle, is performed on the basis of the sensor measurement values of the sensor arrangement 7. By way of example, the temporal change of the sensor measurement values can be helpful here for the detection of the special condition, for example if a caravan or the like has a comparatively constant effect on the sensor measurement values.

However, it is also conceivable for a mechanical configuration change of the motor vehicle to be accompanied by an electrical configuration change of the motor vehicle, said electrical configuration change forming the basis for the detection of at least one special condition. By way of example, an electrically adjustable trailer coupling 11 can be assigned limit switches that are interrogated by the control arrangement 4 directly or indirectly.

A particular high flexibility in the detection of at least one special condition results from the fact that this detection is performed on the basis of the sensor measurement values of an additional sensor 14. In an embodiment, the additional sensor 14 is a camera arrangement 14 illustrated in FIG. 1, said camera arrangement being embodied in particular as a rear view camera. The use of an all-round vision camera is also conceivable here. The detection of a predetermined special condition, in particular of a rain or car wash situation, can then be performed on the basis of the sensor measurement values of the camera arrangement 14.

According to a further teaching, which is likewise accorded independent importance, the above control arrangement 4 for carrying out a proposed method as such is claimed. Reference may be made to all explanations concerning the proposed method which are suitable for elucidating the control arrangement 4 as such.

The invention claimed is:

1. A method for activating a closure element arrangement of a motor vehicle, wherein the closure element arrangement has a closure element, a drive arrangement assigned to the closure element, and a control arrangement, wherein in the context of operator control event monitoring, by the control arrangement, monitoring is carried out to ascertain whether a predetermined operator control event is present, and an activation of the drive arrangement is performed depending on the result of the operator control event monitoring, wherein with assumed freedom of collision of the closure element from the motor vehicle surroundings the occurrence of various special conditions does not permit the operator control event monitoring or permits it only to a restricted extent, and wherein the control arrangement detects an occurrence of predetermined special conditions and the activation of the closure element arrangement is deactivated depending on the respectively detected special condition at least for a predetermined operator control event.

2. The method as claimed in claim 1, wherein the closure element arrangement has a transmitting/receiving unit for a user-side remote control, and wherein in the context of the operator control event monitoring by means of the control arrangement, the reception signals of the transmitting/receiving unit are monitored in respect of whether a predetermined actuation of the remote control is present, and an activation of the closure element arrangement is performed depending on the result of the operator control event monitoring.

3. The method as claimed in claim 1, wherein the closure element arrangement has a sensor arrangement having at least one sensor element embodied as a proximity sensor, wherein in the context of the operator control event monitoring by means of the control arrangement the sensor measurement values of the sensor arrangement are monitored in respect of whether a predetermined operator control event is present, and an activation of the closure element arrangement is performed depending on the result of the operator control event monitoring.

4. The method as claimed in claim 3, wherein at least one operator control event is defined as user movement.

5. The method as claimed in claim 4, wherein the at least one operator control event is defined as foot movement of the operator.

6. The method as claimed in claim 5, wherein the sensor arrangement has at least one sensor element which is embodied as a proximity sensor and which is arranged in or on a rear paneling part of a motor vehicle.

7. The method as claimed in claim 1, wherein the deactivation of the activation of the closure element arrangement is performed depending on the detected special condition for individual or all predetermined operator control events.

8. The method as claimed in claim 1, wherein a special condition of a first type consists in the fact that the predetermined operator control event is not deemed to be detected in the operator control event monitoring despite the presence of a predetermined user movement, and/or wherein a special condition of a second type consists in the fact that the operator control event is deemed to be detected in the operator control event monitoring despite the presence of a user movement that deviates from the predetermined user movement.

9. The method as claimed in claim 8, wherein the mechanical configuration of the motor vehicle in use in accordance with normal operation can be altered by an adjustment process and/or by a mounting process, and wherein an altered mechanical configuration of the motor vehicle is detected as a predetermined special condition by the control arrangement.

10. The method as claimed in claim 8, wherein the activation can be triggered both by means of an operator control event of the actuation of a remote control and by means of an operator control event of the user movement, and wherein at least one special condition is provided, the detection of which brings about a deactivation of the activation of the closure element arrangement for all predetermined operator control events, and/or wherein at least one special condition, in particular the special condition of the first type and/or the special condition of the second type, is provided, the detection of which brings about a deactivation of the activation of the closure element arrangement for the operator control event of the user movement, but not for the operator control event of the actuation of the remote control.

11. The method as claimed in claim 1, wherein a configuration change of a trailer coupling into an operating position is detected as a predetermined special condition by the control arrangement.

12. The method as claimed in claim 1, wherein the connection of an attachment part of the motor vehicle to a trailer coupling of the motor vehicle is detected as a predetermined special condition by the control arrangement.

13. The method as claimed in claim 12, wherein the connection of the attachment part to the trailer coupling comprises an electrical connection and wherein the detection of at least one special condition is performed on the basis of the electrical connection.

14. The method as claimed in claim 1, wherein the connection of a trailer of the motor vehicle to a trailer coupling of the motor vehicle is detected as a predetermined special condition by the control arrangement.

15. The method as claimed in claim 1, wherein an alteration of the measurement conditions for the sensor arrangement is detected as a predetermined special condition by the control arrangement.

16. The method as claimed in claim 15, wherein a rain or car wash situation is detected as a predetermined special condition by the control arrangement.

17. The method as claimed in claim 1, wherein the detection of at least one special condition, in the form of a configuration change of the motor vehicle, is performed on the basis of the sensor measurement values of the sensor arrangement.

18. The method as claimed in claim 17, wherein the mechanical configuration change of the motor vehicle is accompanied by an electrical configuration change of the motor vehicle and wherein the detection of at least one special condition is performed on the basis of the electrical configuration change.

19. The method as claimed in claim 1, wherein the detection of at least one special condition is performed on the basis of the sensor measurement values of an additional sensor.

20. A control arrangement for carrying out a method as claimed in claim 1.

* * * * *